INVENTOR
Charles H. Land
BY
S. E. Thomas
ATTORNEY

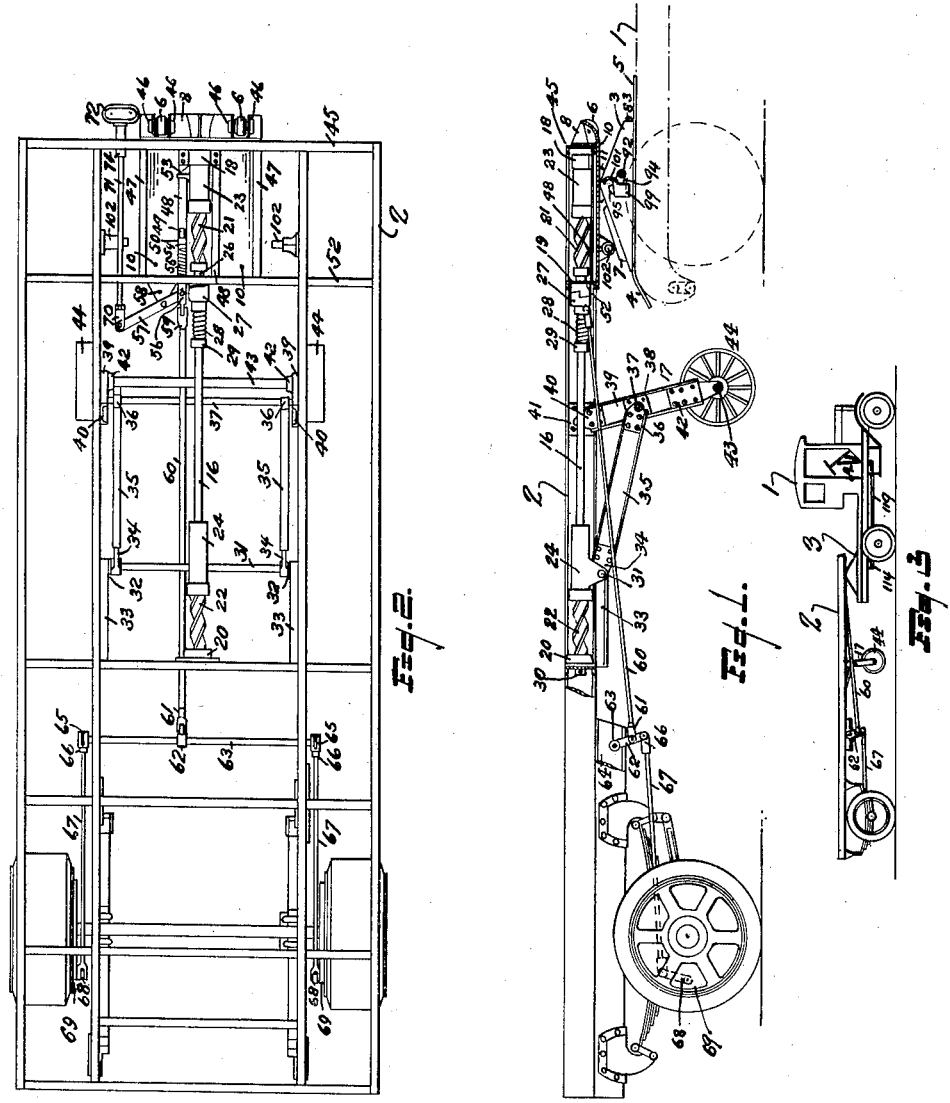
April 1, 1930.  C. H. LAND  1,753,011
TRACTOR TRAILER
Filed Oct. 17, 1928  4 Sheets-Sheet 1
Inventor
Charles H. Land
By S. E. Thomas
Attorney Charles H. Land
INVENTOR
BY
ATTORNEY April 1, 1930.   C. H. LAND   1,753,011
TRACTOR TRAILER
Filed Oct. 17, 1928   4 Sheets-Sheet 3

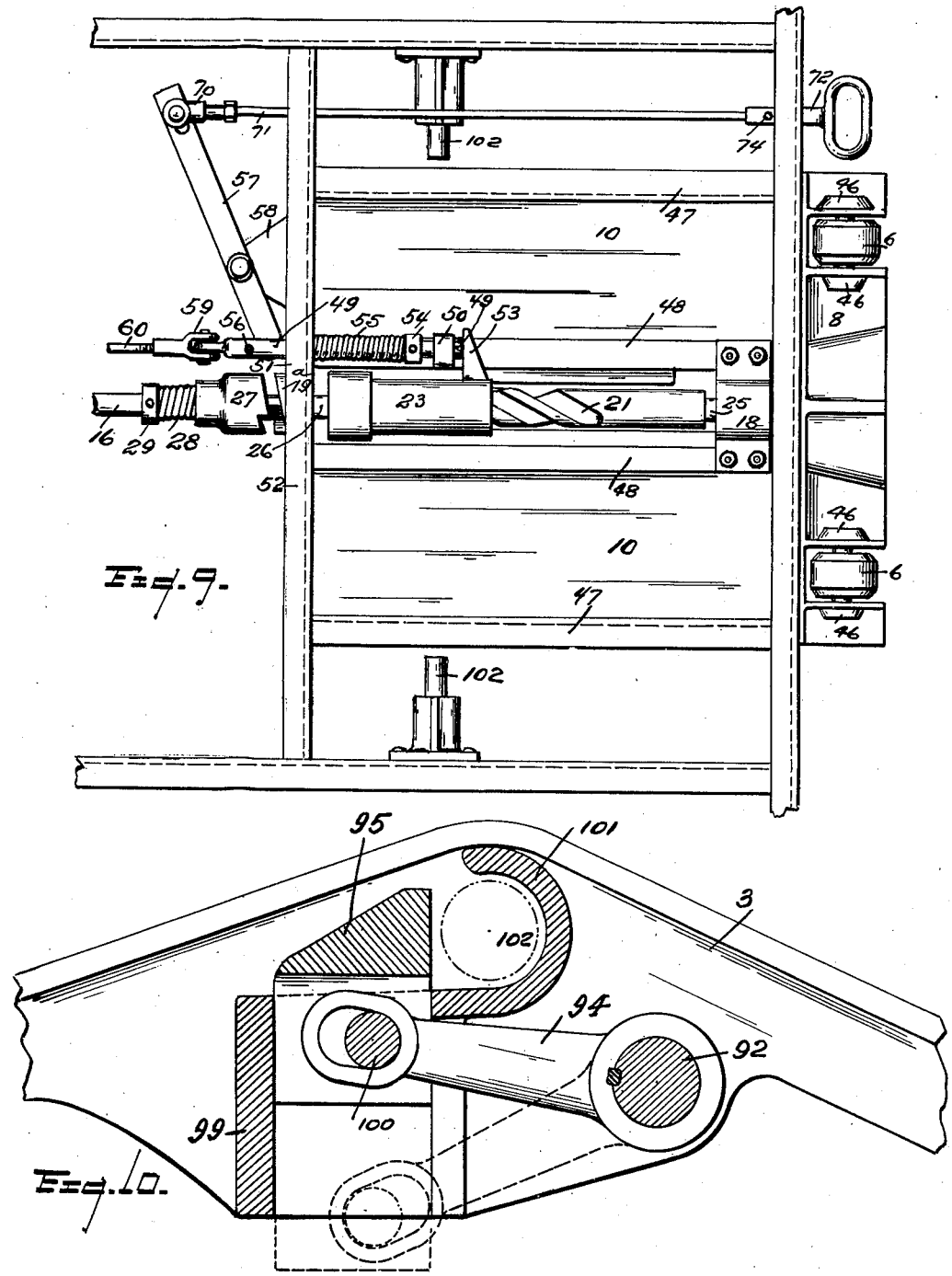

Patented Apr. 1, 1930

1,753,011

UNITED STATES PATENT OFFICE

CHARLES H. LAND, OF DETROIT, MICHIGAN, ASSIGNOR OF ONE-HALF TO WILLIAM H. WILSON, OF DETROIT, MICHIGAN

TRACTOR TRAILER

Application filed October 17, 1928. Serial No. 312,992.

My invention relates to a tractor-trailer combination of the detachably connected type.

The trailer has the usual rear axle assembly with brakes which are spring set and manually released when the trailer is detached from the tractor. These brakes are only used for the coupling and uncoupling of the tractor and trailer;—automatic means being provided to release the brakes upon coupling the tractor to the trailer. Power brakes in the tractor-trailer are preferably used in transit but are not shown.

The trailer is provided near its forward end with a pivoted support adapted to be raised or lowered by the reciprocating motion of the tractor. At is forward end the trailer is also provided with elevating wheels, a rock plate, coupling pins, and a head for actuating a rotary leg mechanism. This constitutes the upper element of a fifth wheel;—the lower element being attached to the tractor.

The lower fifth wheel clement is provided with skids to receive the elevating wheels carried by the trailer so that the trailer may be raised to a coupling position by the backward movement of the tractor. This is also equipped with a turn table, draft mechanism, a locking member, a lock for the rotatable head member and locks to hold the tractor and trailer together for transit,—means being provided to release the locks from the cab through the operation of a single lever.

One of the objects of the present invention is to provide a fifth wheel embodying a permanently inclined surface carried by the tractor for elevating the trailer whereby a coordinating fifth wheel element carried by the trailer may enter into coupling relation with the permanently inclined surface of the fifth wheel member carried by the tractor.

A further object is to provide a guide on one of the inclined faces of the fifth wheel member to insure the necessary alignment for coupling.

Another object is to provide double locking mechanism for holding the trailer and tractor together;—a single lock to couple the heads of a divided rotatable shaft and means for releasing the locks through a single operation by a lever in the cab.

Another feature of the invention consists in a spring actuated clutch on the divided rotatable shaft of the tractor leg mechanism, whereby the shaft is not permitted to turn until the coupling of the tractor-trailer has been effected.

Another feature consists in the employment of the spring brake set which is released through the backward motion of the travelling rotater head mounted upon the divided rotatable shaft.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation of a trailer partly in section, showing the actuating mechanism of the supporting leg and the upper portion of the fifth wheel carried by the trailer, as the latter would appear when mounting the lower portion of the fifth wheel carried by the tractor,—in effecting a coupling relation between the tractor and trailer.

Figure 2 is a plan view of the trailer.

Figure 3 is a diagrammatic elevation of a tractor-trailer combination.

Figure 9 is a fragmentary plan view of the forward end of the trailer, showing the clutch mechanism released.

Figure 10 is an enlarged fragmentary detail partly in section of a detail of the coupling mechanism.

Figure 4:
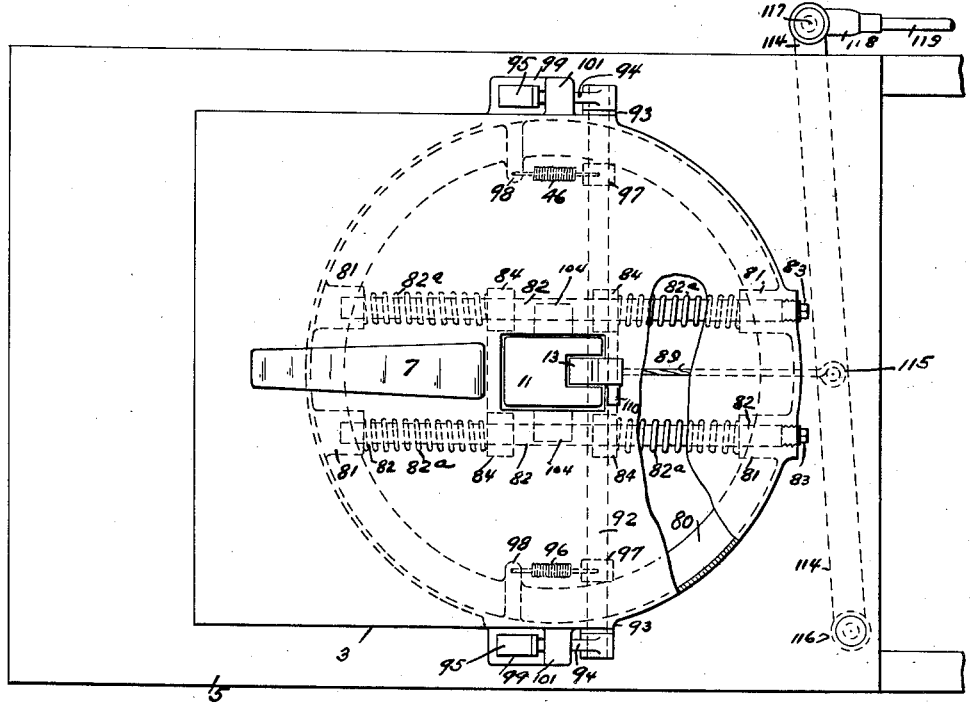
Figure 4 is a plan view of the lower fifth wheel member attached to the plate of the tractor.

Referring now to the reference characters indicating the several parts:

Tractor 1 is provided with a fifth wheel 3, which has an inclined skid face registering with the inclined face of the platform 5, so that it can be backed under trailer 2, in order that the rollers 6 of the trailer may ascend the skid 4 and inclined face of fifth wheel 3.

An upright guide wedge 7 on face of fifth wheel member 3 carried by the tractor, is adapted to enter the flared throat of the skid casting 8 at the front end of trailer, and is guided by the walls forming slot 9, onto plates 10—10 on trailer, until the plates 10—10 come in contact with the curved apex of the fifth wheel.

When the tractor is backed into position under the trailer, the plates 10—10 slide upon the apex 3, and the head 11 of fifth wheel follows down slot 9 of the skid casting.

Figure 5:
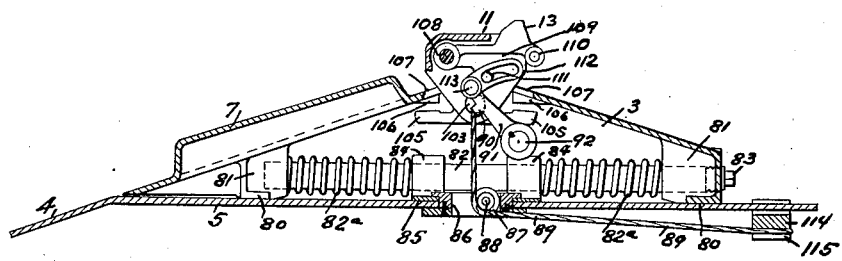
Figure 5 is a longitudinal vertical sectional view of the portion of the fifth wheel member attached to the tractor, showing the draft mechanism and lock controlling device.

When the travelling rotator head 23 on trailer is reached, lock 13 on fifth wheel (which is depressed) jumps into opening 14 of head 23;—the rear face of head 11 contacting with lug 15, see Figure 5.

The trailer is provided with a longitudinal rotary shaft 16 which actuates a supporting element 17. This shaft is journaled in bearings 18—19—20 attached to frame of trailer and is composed of two sections having a helix 21 at the front end and a helix 22 at the rear end, which respectively mesh with the travelling actuating heads 23—24.

Projecting from the front end of helix 21 is a shaft 25 (see Figures 6 and 7) which rotates and slides in bearing 18. At its rear end is a similar shaft 26, which also rotates and slides in bearing 19, and has a squared end fitted and pinned to spiral clutch casting 27. This section of clutch (27) supports the squared end of shaft 16 and is so arranged that it can slide on it for a short distance against spring 28,—abutting against collar 29 pinned to shaft 16. Clutch segment 19ª— which may be integral with bearing 19, is rigidly attached to trailer frame.

The rear helix 22 has a projecting shaft journaled in bearing 20 and pinned at 30 (see Figure 1) to prevent any longitudinal movement.

Head 24 has downwardly extending ears (see Figure 1) which support a cross bar 31. At each end of this bar rollers 32—32 are attached;—these rollers slide in channel guides 33—33 welded to trailer frame. On same shaft near to the wheels are bearing castings 34—34 riveted to the supporting channel leg arms 35—35. The end of these arms carry bearing castings 36—36 through which extends a cross bar 37 journaled in castings 38—38 riveted to the channel side members 39—39 of supporting leg frame. At the upper end of these members are riveted castings 40—40 pivotally connected to castings 41—41 attached to the main frame of the trailer. At the lower end are riveted the bearing castings 42—42 through which extends the axle 43. In the ends of this axle are attached the wheels 44—44.

At the front cross member 45 of trailer is attached a skid casting 8 having a central flared throat to receive head 11. Spaced apart and journaled in lugs 46—46 are elevating wheels 6—6.

On the under side of the frame are attached two heavy plates 10—10 spaced apart along the longitudinal axis so that they form a guide way for head 11. Supporting these plates are two longitudinal channel members 47—47.

Two Z-shaped members 48—48 extending longitudinally, are welded to the upper face of plates 10—10, and at the front end of the trailer across these Z-shaped members is bolted a bearing casting 18.

The trailer is equipped with a brake mechanism for coupling and uncoupled operations.

A slide bar 49 is supported by lug 50, attached to Z member 48, and casting 51 attached to cross-member 52. The bar 49 has a free projecting end which contacts with lug 53 of head 23 for brake release. Coiled about 49, held between collar 54 pinned to 49, and member 52 is an expanded coil spring 55. Extending downwardly through 49 is a pressed pin 56 which contacts with face of manually operated lever 57. This lever is pivoted in casting 58 which is welded to member 52. A yoke end 59 is pivoted to the end of bar 49. To this yoke end is threaded a brake rod 60.

Brake rod 60 extends rearwardly to yoke end 61 which is pivoted to lever 62 clamped to rocker shaft 63. Rocker shaft 63 extends across trailer through bearings in sub-frame 64—64. At each end are levers 65—65 carrying yoke ends 66—66 with threaded brake rods 67—67. These rods are yoked to the levers 68—68 attached to the usual brake mechanism 69—69.

Figure 8:
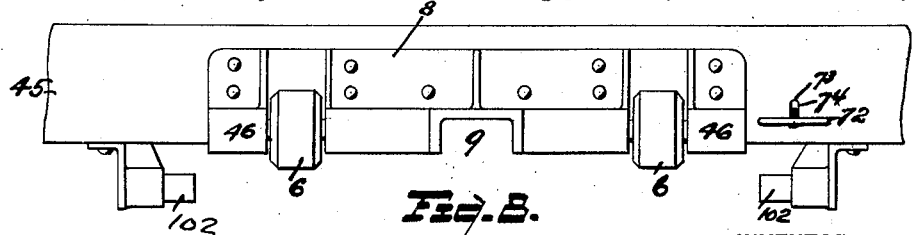
Figure 8 is an end elevation of the trailer with parts broken away, showing the slot in the flared throat of the skid casting to receive the guide wedge of the fifth wheel carried by the tractor.

Pivotedly and slidably pinned to end of lever 57 is a yoke end 70 (see Figure 6) in which is threaded and locked a pull rod 71. The forward end of 71 is threaded into a handle 72 which passes through and bears in an opening 73 in web of front cross member 45. This handle 72 has an upstanding pin 74 which acts as a lock when pulled through opening 73 (see Figure 8) and given a slight turn with handle. This is used when it is desired to move the trailer about in a detached position.

The tractor member of fifth wheel 3 bears on plate or platform 5 (see Figures 5 and 7) and is horizontally turnable and slidable on same. It consists of a casting having a circular ring 80 at its base and four lugs 81—81, 81—81, spaced apart at opposite edges of circumference, bored to hold the draft bars 82—82.

On draft bars 82—82 are expanded coil springs 82ª—82ª. These bars are held in positions by threaded taper plugs 83—83. Draft bars 82 are slidable through lugs 84—84, 84—84, which project upwardly from a ring plate 85. This plate is held in turnable contact with platform 5 by the annular ring 86 which projects through and bears on platform 5. Upper and lower lips on 86 prevent upward displacement.

A flanged pulley wheel 87 is carried by a horizontal shaft 88 journaled in lugs on inside wall of ring 86 and so arranged that the cable 89 remains in a central position without regard to position of trailer to tractor. One end of this cable is attached to lug 90 of lever 91 which is keyed to rocker lock shaft 92.

Shaft 92 extends across the inside of 3 and through bosses 93—93 on the outside. At each end is keyed a lever 94—94 which actuates the main locks 95—95.

Suspended from 92 and clamped to it are two spring 96—96 actuated levers 97—97 for keeping locks 95—95 in an engaging position. These springs are hooked in holes bored in ends of levers 97—97 and lugs 98—98.

Locks 95—95 slide in housings 99—99 cast on 3—see Figures 4–7. They are slotted to accommodate ends of levers 94—94 which work on cross pins 100—100, see Figure 10.

Figure 6:
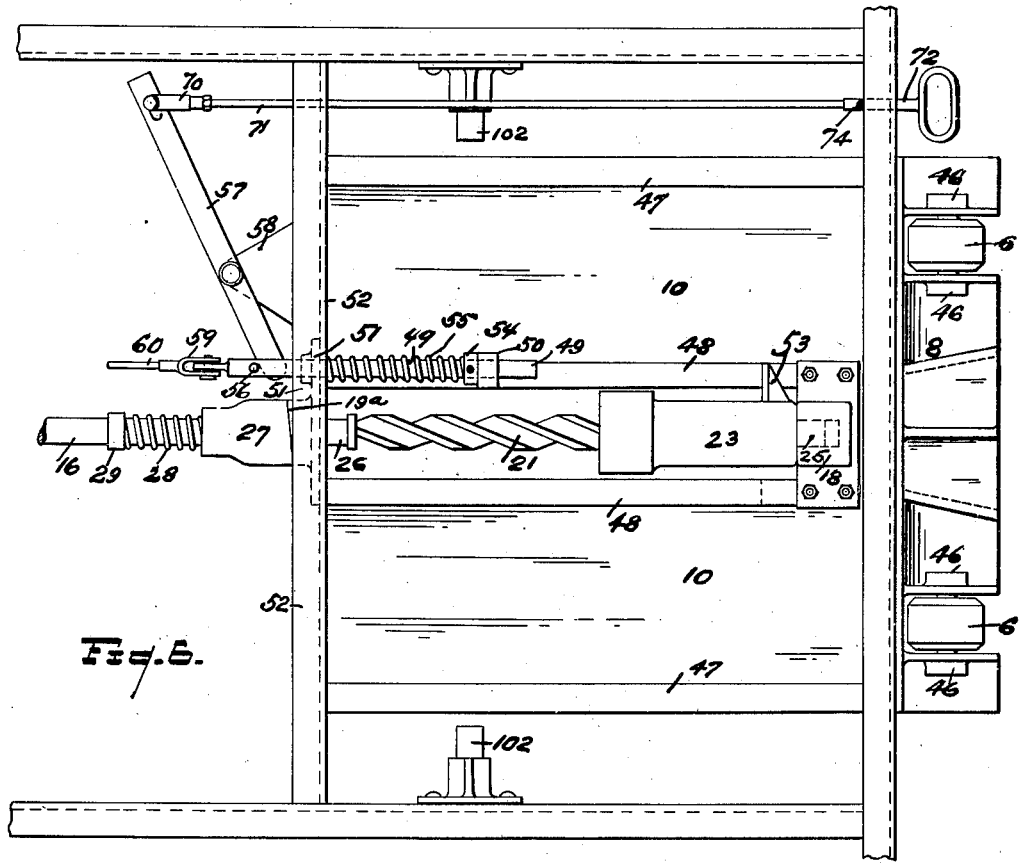
Figure 6 is a fragmentary plan view of the forward end of the trailer showing the upper fifth wheel coupling member carried thereby.
Figure 7:
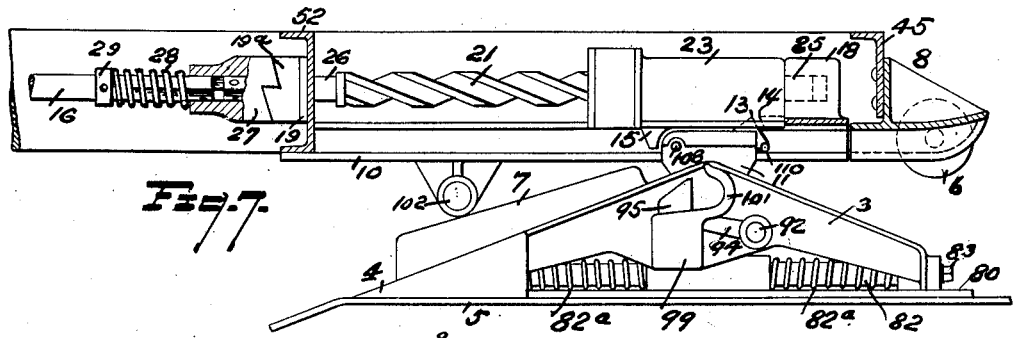
Figure 7 is a fragmentary elevation with parts in section of the forward end of the trailer showing the fifth wheel member carried by the tractor locked to the rotating member on the trailer preparatory to effecting a locking relation between the tractor and trailer.

Arced stops 101—101 are provided to seat lock pins 102—102 riveted to frame of trailer, see Figures 6 and 7.

Head 11 is a hollow casting projecting upwardly from apex of 3 and pivotally attached to it by pins 103—103 journaled in bosses 104—104—see Figures 4–5. At the lower sides of 11 are projecting ears 105—105 which contact with the under-faces 106—106 of the inclined members 3 to limit the rocking motion of the head 11. A portion of the center of the apex of 3 is cut away at 107 to allow for rocking the head 11.

On the inside of 11 pivoted on pin 108 is a lock lever 109, a wedged shaped portion 13 of which projects upwardly through a slot in its forward end for engagement with head 23 (see Figure 7). Below this and projecting laterally is a stop lug 110 which rides over plate 10 after coupling and prevents lock tripping in transit.

Through the lower web of this lever projects a pin 111 (see Figure 5) around which slides the link 112. This link is pivotedly pinned at 113 to end of lever 91.

Cable 89 is attached to lever 114 at 115;—see Figure 4. Lever 114 is pivoted by pin 116 to plate 5 and at its opposite end the lever is pivoted at 117 to a yoke end 118 threaded to a rod 119, which extends to a lever mounted in the tractor cab.

Having indicated the various parts by reference characters, I will now proceed with a description of the operation of the device which first consists in backing the rear end of tractor under the front end of the trailer whereupon the elevating wheels 6 come in contact with the skids 4 and raise the supports 17 from the ground bringing the throat of the skid casting 8 in position to receive the upwardly projecting guide 7 on the fifth wheel member of the tractor, thereby limiting any turning movement of the fifth wheel member. The elevating wheels 6 continue up the inclined face of the fifth wheel 3 until the apex is passed, the plates 10—10 coming into contact with said apex. From this point the plates 10—10 slide upon the apex of the lower fifth wheel element to the completion of the leg lifting operation and final coupling;—the apex serving as a rocking surface while the vehicle is in transit.

The head 11 is guided between the plates 10—10 and members 48—48 to coupling relation with the head 23 on trailer. Projection 13 on lever 109, now springs into opening 14 of head 23 and simultaneously the rear face of 11 contacts with the lug 15 and forces it rearwardly.

The helix 21 cannot rotate until the clutch 27—29 is disengaged, this arrangement is desirable to prevent the forwardly projecting supporting leg 17 from swinging backward into a dangerous position when the front end of the trailer is lifted by the tractor. It also insures a coupling of 11 to 23 being made before leg is raised.

Shafts 25—26 slide in their bearings 18 and 19. The segment 27 of the clutch is pinned to shaft 26 and is slidable on square end of 16 against the expanded coil spring 28. Thus the backing of the tractor disengages 27 from the rigidly attached clutch segment 19, allowing the head 23 to rotate helix 21 and shaft 16. This motion is transmitted to helix 22 which is in mesh with head 24, thereby forced backward, lifting the supporting leg 17 into a non-supporting position.

The lock pins 102—102 depress the locks 95—95 as the tractor is backed into position and are thereby held locked when the pins contact with pockets 101—101—see Figure 7.

Near the end of the coupling operation, lug 53 of head 23, contacts with the end of the slide bar 49 of the spring brake mechanism, compressing spring 55, whereupon the brakes 69—69 are released.

The tractor and trailer are now coupled together and the unit is ready for transit.

To uncouple, the lever A in the cab is pulled. This motion is transmitted by rod 119 to lever 114 and cable 89 which is attached to lever 91. As lever 91 is clamped and keyed to rock shaft 92 the locks 95—95 are depressed by levers 94—94 keyed to same shaft. The link 112 allows this motion without exerting any pull on pin 111 of lever 109. Also lug 110 prevents any release of lever 109 by contact with edge of plate 10 until the end of the leg lowering stroke is reached.

A forward motion of the tractor will now lower the leg 17.

At the end of the stroke a further pull of cab lever A, will depress the lock lever 109 and lock 13 will leave pocket 14, lug 110 passes through opening cut in 10, (see Figure 7) the plates 10—10 slide along apex of 3, wheels 6—6 then roll down inclined face of 3 and off of skid 4.

The tractor is now disconnected. The brakes are set when lug 53 breaks contact with end of bar 49;—it being noted however that the final operation of uncoupling is attained through a manual release.

Having thus described my invention what I claim is:

1. In a tractor-trailer combination, wherein a trailer is adapted to be coupled to the tractor in superposed relation to the latter; a fifth wheel adapted to effect the coupling relation, comprising a lower non-rockable skid member having a permanent upwardly inclined surface attached to the frame of the tractor; an upper fifth wheel member carried by the trailer, adapted to coordinate with the lower fifth wheel member of the tractor to effect the coupling relation between tractor and trailer; means for coupling the upper and lower fifth wheel members together; means for guiding the upper fifth wheel member into coupled relation with the lower fifth wheel member; and means for locking the upper and lower fifth wheel members when coupled together.

2. In a tractor-trailer combination, wherein a trailer is adapted to be coupled to the tractor in superposed relation; a fifth wheel adapted to effect said coupling relation, comprising a lower member attached to the frame of the tractor, having opposing permanently inclined surfaces extending upwardly to an apex formed by said inclined surfaces; an upper coordinating fifth wheel member carried by the trailer tiltable upon the apex of the lower fifth wheel member in transit; means for coupling the upper and lower fifth wheel members together; a guide wedge extending upwardly from the lower fifth wheel member, a skid member adjacent the upper fifth wheel member, provided with a groove to receive the guide wedge, whereby the coordinating fifth wheel members may be held against lateral movement with respect to each other and guided into coupling relation; and means for locking said upper and lower fifth wheel members in coupled relation.

3. A structure as specified in claim 2, in combination with coordinating means located on opposite sides of the fifth wheel for locking the tractor and trailer together and means operable from the tractor cab for releasing said locking means.

4. A structure as specified in claim 2 in combination with fixed hook-shaped members and rocking wedge-shaped members located on opposite sides of the fifth wheel, a pair of lock pins projecting inwardly from the frame of the trailer adapted to coordinate with the fixed hook and rocking members carried by the fifth wheel member of the tractor; and means operable from the cab of the tractor for releasing said locking means.

5. In a tractor-trailer combination, wherein a trailer is adapted to be coupled to the tractor in superposed relation; a fifth wheel adapted to effect said coupling relation, comprising a lower horizontally turnable member attached to the tractor frame and provided with opposing permanently inclined surfaces extending upwardly to an apex formed by said inclined surfaces; an upper coordinating fifth wheel member carried by the trailer tiltable upon said apex in transit; means for coupling the upper and lower fifth wheel members together; a guide wedge projecting upwardly from the lower fifth wheel member, a skid member adjacent the upper fifth wheel member, provided with a groove to receive the guide wedge, whereby the coordinating fifth wheel members may be held against lateral movement with respect to each other and guided into coupling relation; and means for locking said upper and lower fifth wheel members in coupled relation.

6. In a tractor-trailer combination, wherein a trailer is adapted to be coupled to the tractor in superposed relation to the latter; a fifth wheel adapted to effect the coupling relation, comprising a lower member embodying permanent opposing upwardly inclined surfaces, of wedge-shaped form; a rocking coupling member projecting above the apex of said wedge-shaped member; means for limiting the rocking movement of said coupling member, an upper fifth wheel member carried by the trailer, a rotatable shaft journaled in the frame of said upper fifth wheel member; a travelling head mounted on and adapted to rotate said shaft; means for locking the rocking coupling member in cooperative relation with the travelling head to effect the rotation of the shaft; a swinging leg for supporting the trailer; and means actuated by said rotatable shaft connected with the swinging leg for raising and lowering said leg upon backing the tractor into the trailer or upon releasing it from the latter.

7. A structure as specified in claim 6, in combination with means adapted to secure the locking means for said head against release while the tractor and trailer are in transit relation.

8. A structure as specified in claim 6 in combination with a normally set spring actuated trailer brake mechanism; and means carried by the travelling head, adapted to release said spring actuated brake mechanism upon backing the tractor into the trailer to effect simultaneously the coupling of the tractor to the trailer, and the raising of the supporting leg.

9. In a tractor-trailer combination, wherein a trailer is adapted to be coupled to the tractor in superposed relation to the latter; supporting means for the forward end of the trailer adapted to be moved into or out of action; a divided longitudinally disposed rotatable shaft journaled upon the trailer with one portion of said shaft slidable in its bearings, a clutch adapted to secure said shaft against rotation; means operably connecting said trailer supporting means with one section of said rotatable shaft; whereby the trailer supporting means may be brought into or out of action; means adapted to rotate said shaft and means carried by the tractor adapted to engage said means for rotating the shaft, whereby the sections of the rotatable shaft may be shifted from a nonrotative clutched relation that the shaft may be rotated to move the trailer supporting means into or out of action.

10. In a tractor-trailer combination, wherein a trailer is adapted to be coupled to the tractor in superposed relation to the latter; a swinging supporting leg for the trailer, a longitudinally disposed helical shaft journaled on the trailer, formed in two sections rotatably connected together, with one portion slidable in its bearings; means adapted to secure the shaft against rotation; a pair of travelling heads respectively mounted on each section of the helical shaft; means operably connecting said swinging supporting leg with one of said travelling heads; and means carried by the tractor adapted to engage the other travelling head when backed into the trailer, whereby the sections of the helical shaft are released from their non-rotatable clutched relation, that the shaft may be rotated to raise or lower the supporting leg.

11. In a tractor-trailer combination, wherein a trailer is adapted to be coupled to the tractor in superposed relation to the latter; a swinging supporting leg for the trailer, a longitudinally disposed helical shaft journaled on the trailer, formed in two sections rotatably connected together, with one portion slidable in its bearings; a spring actuated clutch mechanism, adapted to secure the shaft against rotation; a pair of travelling heads respectively mounted on each section of the helical shaft; means operably connecting said swinging supporting leg with one of said travelling heads; and means carried by the tractor adapted to engage the other travelling head when backed into the trailer, whereby the sections of the helical shaft are released from their non-rotative clutched relation, that the shaft may be rotated to raise or lower the supporting leg.

12. In a tractor-trailer combination, wherein a trailer is adapted to be coupled to the tractor in superposed relation to the latter; a fifth wheel adapted to effect the coupling relation, comprising a lower member embodying permanent opposing upwardly inclined surfaces, of wedge-shaped form; a rocking coupling member projecting above the apex of said wedge-shaped member; means for limiting the rocking movement of said coupling member, an upper fifth wheel member carried by the trailer, a rotatable shaft journaled in the frame of said upper fifth wheel member; a travelling head mounted on and adapted to rotate said shaft; means for locking the rocking coupling member in cooperative relation with the travelling head to effect the rotation of the shaft; means adapted to secure the locking means for said head against release while the tractor and trailer are in transit relation; means for releasing said lock securing means, actuated from the tractor cab at the end of the uncoupling stroke; a swinging leg for supporting the trailer; and means actuated by said rotatable shaft connected with the swinging leg for raising and lowering said leg upon backing the tractor into the trailer or upon releasing it from the latter.

13. In a tractor-trailer combination, wherein the trailer is coupled to the tractor in superposed relation to the latter; a fifth wheel adapted to effect the coupling relation, comprising a lower non-rockable skid member, having a permanent upwardly inclined guide member surface of wedge-shape form, attached to the frame of the tractor; an upper fifth wheel member carried by the trailer, tiltable in transit upon the apex of the wedge-shape portion of the lower fifth wheel member of the tractor; and means for coupling the upper and lower fifth wheel members together to effect a coupling relation between the tractor and trailer.

14. In a tractor-trailer combination, wherein the trailer is adapted to be coupled to the tractor in superposed relation to the latter; a fifth wheel adapted to effect the coupling relation, comprising a lower non-rockable skid member having a permanent upwardly inclined guide member surface of wedge-shape form attached to the frame of the tractor; an upper fifth wheel member carried by the trailer, tiltable in transit upon the apex of the inclined surface of the lower fifth wheel member of the tractor; means for coupling the upper and lower fifth wheel members together to effect a coupling relation between the tractor and trailer; and means for locking the upper and lower fifth wheel members when coupled together.

In testimony whereof, I sign this this specification.

CHARLES H. LAND.